United States Patent
Lagerqvist et al.

(10) Patent No.: US 11,043,996 B2
(45) Date of Patent: Jun. 22, 2021

(54) MANAGING TRANSMISSION OF A CELL-SPECIFIC REFERENCE SIGNAL

(71) Applicant: Telefonaktiebolaget LM Ericsson (publ), Stockholm (SE)

(72) Inventors: Tomas Lagerqvist, Stockholm (SE); Mats Åhlander, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/480,446

(22) PCT Filed: Mar. 10, 2017

(86) PCT No.: PCT/SE2017/050234
§ 371 (c)(1),
(2) Date: Jul. 24, 2019

(87) PCT Pub. No.: WO2018/164617
PCT Pub. Date: Sep. 13, 2018

(65) Prior Publication Data
US 2020/0014441 A1 Jan. 9, 2020

(51) Int. Cl.
*H04L 5/00* (2006.01)
*H04B 7/04* (2017.01)
(Continued)

(52) U.S. Cl.
CPC ......... *H04B 7/0617* (2013.01); *H04B 7/0408* (2013.01); *H04B 7/0456* (2013.01);
(Continued)

(58) Field of Classification Search
CPC ...... H04L 5/005; H04B 7/0617; H04B 7/0408
See application file for complete search history.

(56) References Cited

U.S. PATENT DOCUMENTS

| 2009/0252250 | A1  | 10/2009 | Heath, Jr. et al. |
| 2015/0124688 | A1* | 5/2015  | Xu ............ H04L 27/2607 370/312 |

(Continued)

FOREIGN PATENT DOCUMENTS

| EP | 3 051 906 A1    | 8/2016 |
| WO | WO 2008/115588 A2 | 9/2008 |

(Continued)

OTHER PUBLICATIONS

International Search Report and Written Opinion of the International Searching Authority, PCT/SE2017/050234, dated May 26 2017, 12 pages.

(Continued)

*Primary Examiner* — Hoon J Chung
(74) *Attorney, Agent, or Firm* — Sage Patent Group

(57) ABSTRACT

There is provided a method for managing transmission of a Cell-specific Reference Signal, CRS, comprising a plurality of reference symbols to User Equipment, UE, in a wireless communication system operating at least one cell or sector. The method comprises identifying a UE for which a beamformed transmission of data is scheduled during a transmission time interval, and enabling, during the transmission time interval, beamformed transmission of at least part of the reference symbols of the CRS for targeting the identified UE.

16 Claims, 21 Drawing Sheets

(51) Int. Cl.
    *H04B 7/06*           (2006.01)
    *H04B 7/0456*       (2017.01)
    *H04W 16/28*        (2009.01)
    *H04W 72/12*        (2009.01)
    *H04B 7/0408*       (2017.01)

(52) U.S. Cl.
    CPC ............ *H04L 5/005* (2013.01); *H04L 5/0051* (2013.01); *H04L 5/0082* (2013.01); *H04W 16/28* (2013.01); *H04W 72/1263* (2013.01)

(56) References Cited

U.S. PATENT DOCUMENTS

2018/0069750 A1\* 3/2018 Yoo .......................... H04L 41/08
2019/0281607 A1\* 9/2019 Gao ......................... H04L 5/005

FOREIGN PATENT DOCUMENTS

WO     WO 2016/032381 A1     3/2016
WO     WO 2016/071010 A1     5/2016

OTHER PUBLICATIONS

Ericsson, "Lean Carrier LTE from Ericsson", Retrieved from https://www.ericsson.com/en/networks/offerings/lean-carrier on May 17, 2017, 4 Pages.

3GPP TR 36.897 V13.0.0 (Jun. 2015), 3rd Generation Partnership Project; Technical Specification Group Radio Access Network; Study on elevation beamforming / Full-Dimension (FD) Multiple Input Multiple Output (MIMO) for LTE (Release 13), 58 Pages.

\* cited by examiner

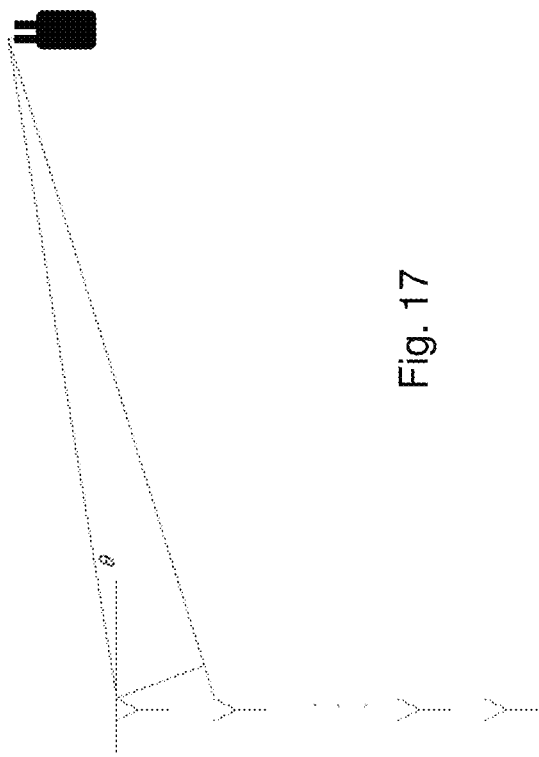

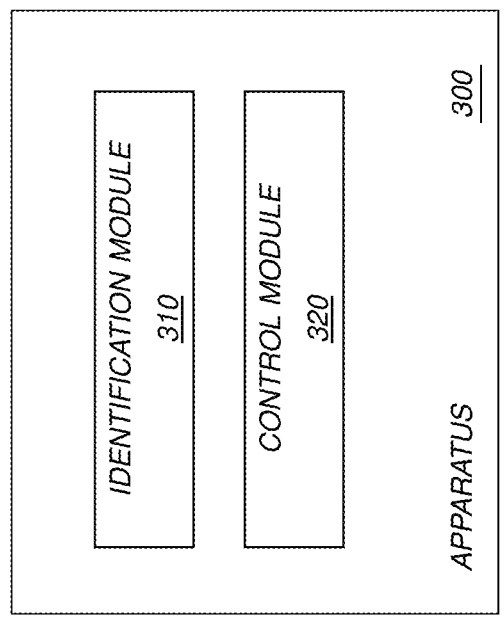

MANAGING TRANSMISSION OF A CELL-SPECIFIC REFERENCE SIGNAL

TECHNICAL FIELD

The proposed technology relates to a method and arrangement for managing transmission of a Cell-specific Reference Signal, CRS, comprising a plurality of reference symbols to User Equipment, UE, in a wireless communication system operating at least one cell or sector as well as a corresponding network device, computer program, computer-program product and apparatus.

BACKGROUND

Reference signals are useful in modern wireless communication systems, including state-of-the-art systems such as Long Term Evolution (LTE) systems, also referred to as 4G systems, as well as future generation systems such as 5G.

It may be useful to start with a very brief overview of the LTE architecture. To start with, the Evolved Universal Terrestrial Radio Access Network (E-UTRAN) is the LTE radio access network. The E-UTRAN employs a multi-carrier modulation scheme called Orthogonal Frequency Division Multiple Access (OFDMA) in the downlink.

E-UTRAN is based on evolved NodeBs (eNBs) which serve E-UTRAN cells. An E-UTRAN cell is defined by certain signals which are broadcasted from the eNB. These signals contain information about the cell which can be used by User Equipment (UEs) in order to connect to the network through the cell. The signals comprise both reference and synchronization signals which the UE uses to find the frame timing as well as system information which contains parameters relevant for the whole cell.

A UE that wants to connect to the network must thus first listen for a suitable cell. If such a cell is found the UE performs random access according to system information for the cell in order to transmit an RRC connection setup request. Assuming the random access procedure succeeds and the eNB receives the request, the eNB will either answer with an RRC connection setup message (typical case) which acknowledges the UEs request and tells it to move into RRC connected state or an RRC connection reject which tells the UE that it may not connect to the cell (not typical).

A so-called Cell-specific Reference Signal (CRS) comprises UE known reference symbols that are inserted within the OFDM time and frequency grid. The reference symbols are normally used by the UE for downlink channel estimation. Channel estimation is typically used for demodulation of downlink data both when the UE is in RRC connected state and is receiving user data and when the UE shall read system information. Due to the latter use case, the CRSs must be transmitted even from cells which don't have any UEs in RRC connected state since the eNB cannot know whether a UE wants to access the network until it performs random access. Downlink cell specific reference signals are inserted within the first and third last OFDM symbol of each slot with a frequency domain spacing of six sub-carriers.

In case of downlink multi antenna transmission the UE must be able to estimate the channel corresponding to each individual antenna. In order to achieve this there is one downlink reference signal transmitted from each antenna port.

To allow the user equipment to accurately estimate the channel coefficients, nothing is transmitted on the other antenna at the same time-frequency location of reference signals.

FIG. 1 is a schematic diagram of relevant parts of a wireless communication system in which data and control signaling, including reference signals, may cause interference between cells, so-called inter-cell interference.

For a better understanding it may be useful to begin by explaining briefly an example of the structure of resources in frequency and time in a wireless communication system.

FIG. 2 is a schematic time-frequency diagram illustrating an example of the structure of the time-frequency resources for radio transmission. In the time-domain, a frame includes a number of subframes, and a subframe may optionally include one or more time slots. A subframe normally corresponds to a Transmission Time Interval (TTI), although the TTI may correspond to a time slot in some wireless communication systems. A resource block, also referred to as a Physical Resource Block (PRB), may for example include a number M of subcarriers in the frequency domain. The resource blocks are distributed in the frequency domain over a predetermined bandwidth. In the time domain, resource blocks are normally assigned in pairs per subframe.

For the specific example of Long Term Evolution (LTE), one frame is 10 ms and includes 10 subframes. One subframe is 1 ms and includes 2 slots. One slot is 0.5 ms in the time domain and each slot can be assigned N resource blocks, 6<N<100, depending on bandwidth allocation and resource availability. One resource block is 0.5 ms and includes 12 subcarriers for each OFDM symbol in the frequency domain. There are 7 symbols (normal cyclic prefix) per time slot in the time domain or 6 symbols in long cyclic prefix.

For LTE, Orthogonal Frequency Division Multiplexing (OFDM) is normally used in the downlink and Single Carrier Frequency Domain Multiple Access (SC-FDMA) in the uplink. One of the basic principles of LTE radio access is shared-channel transmission in which time-frequency resources are dynamically shared between users.

FIG. 3 is a schematic diagram illustrating a more detailed example of the structure of the time-frequency resources for a given subframe. With reference to the particular example of FIG. 3, in the time domain, one sub frame of 1 ms duration is divided into 12 or 14 OFDM (or SC-FDMA) symbols, depending on the configuration. One OFDM (or SC-FDMA) symbol includes a number of sub carriers in the frequency domain, depending on the channel bandwidth and configuration. One OFDM (or SC-FDMA) symbol on one sub carrier is referred to as a Resource Element (RE).

Each subframe may have a control region and a data region. In the following we will mainly focus on the data region.

As can be seen in FIG. 3, reference symbols of a given reference signals may be distributed over the time-frequency structure in selected Resource Elements. FIG. 3 is valid for an example with 2 antennas. If by way of example 4 antennas are used, twice as many reference symbols will be transmitted. This is further explained with reference to FIG. 4.

FIG. 4 is a schematic diagram illustrating an example of the mapping of reference symbols according to the 3GPP Technical Specification 36.211.

The position of the CRS can be shifted in the frequency domain between different cells. The CRSs can be shifted between 0-5 sub carriers. The cell specific frequency shift is given by the cell identity (Cell ID).

The purpose of the shift in frequency domain is to reduce disturbance of CRSs between neighboring cells. However, the CRSs may still cause disturbance of PDSCH/PDCCH.

It is also possible to configure the power of the reference symbols. Possible values are: −3, −2, −1, 0, 1.77 and 3 dB compared to the other symbols. This power difference is signaled to the UE in the system information and is used to improve the demodulation performance for modulation types which carry information in the amplitude domain (16 QAM and 64 QAM).

The UE measures the average Reference Signal Received Power (RSRP) from each cell it can hear, and uses that information to decide which of the suitable cells to connect to. The RSRP is also used for connected state mobility, where the eNB uses layer 3 measurement reports from the UE sent on the uplink shared channel to make handover decisions. 3GPP offers a set of tools and mechanisms which the eNB can configure in the UE in order to get reports which are relevant and needed. One example is the standard A3 event in which the eNB configures the UE to send the RSRP of both the serving cell and neighbor cells should the neighbor RSRP become sufficiently strong compare to the serving cell.

Unrelated to CRS, but related to mobility, the eNB typically stores an address database with cell identities for other (neighboring) eNBs in order to know how to contact the eNB of potential target cells for handover. Each cell served by an eNB typically stores which cells in the data base it has neighbor relations to, i.e. which of the cells in the general area UEs often perform handover to. Exactly how this database is created is not of any major significance to this invention, but a cell's neighbor relations will be referred to as the cell's neighbor relation list.

A problem with the existing solution of shifting the Cell-specific Reference Signals between cells is that even though reference symbols between cells will not interfere, the reference symbols of one cell will disturb the PDSCH symbols of neighboring cells. The disturbance could impact UE DL throughput in neighboring cells. This will especially be the case in borders between cells.

The Ericsson feature Ericsson Lean Carrier solves part of this problem by only transmitting CRSs when the UE expects them. In short the Ericsson lean carrier solution significantly reduces reference signaling, e.g. by omitting CRS transmission except the center 6 PRBs if it expects all UEs to be in DRX. Aligned on-durations among UEs increase the muting possibilities. When a SIB, page or a UE is scheduled full BW CRSs are transmitted.

The above solution will give large muting possibilities for low loaded cells. However, as the number of RRC connected UEs increases, the muting possibilities will be reduced.

There is thus still room for improvements with regard to the issue of reducing inter-cell interference in wireless communication systems.

SUMMARY

It is an object to provide a method for managing transmission of a Cell-specific Reference Signal, CRS, to User Equipment, UE, in a wireless communication system.

It is also an object to provide an arrangement configured to manage transmission of a Cell-specific Reference Signal, CRS, to User Equipment, UE, in a wireless communication system.

Another object is to provide a network device comprising such an arrangement.

Yet another object is to provide a corresponding computer program and computer-program product.

Still another object is to provide an apparatus for managing transmission of a Cell-specific Reference Signal, CRS, to User Equipment, UE, in a wireless communication system.

These and other objects are met by embodiments of the proposed technology.

According to a first aspect, there is provided a method for managing transmission of a Cell-specific Reference Signal, CRS, comprising a plurality of reference symbols to User Equipment, UE, in a wireless communication system operating at least one cell or sector. The method comprises:
identifying a UE for which a beamformed transmission of data is scheduled during a transmission time interval, and
enabling, during the transmission time interval, beamformed transmission of at least part of the reference symbols of the CRS for targeting the identified UE.

In this way, UE-specific beamforming of at least part of a Cell-specific Reference Signal, CRS may be provided, which in turn reduces the interference level and/or power consumption in the system. In particular, inter-cell interference may be significantly reduced and the power consumption may be reduced.

The proposed technology thus provides a way to reduce interference by beamforming Cell-specific CRSs.

According to a second aspect, there is provided an arrangement configured to manage transmission of a Cell-specific Reference Signal, CRS, comprising a plurality of reference symbols to User Equipment, UE, in a wireless communication system operating at least one cell or sector. The arrangement is configured to identify a UE for which a beamformed transmission of data is scheduled during a transmission time interval. The arrangement is further configured to enable, during the transmission time interval, beamformed transmission of at least part of the reference symbols of the CRS for targeting the identified UE.

According to a third aspect, there is provided a network device comprising such an arrangement.

According to a fourth aspect, there is provided a computer program comprising instructions, which when executed by at least one processor, cause the at least one processor to:
identify a User Equipment, UE, for which a beamformed transmission of data is scheduled during a transmission time interval, and
enable, during the transmission time interval, beamformed transmission of at least part of the reference symbols of a Cell-specific Reference Signal, CRS, for targeting the identified UE.

According to a fifth aspect, there is provided a computer-program product comprising a computer-readable medium having stored thereon such a computer program.

According to a sixth aspect, there is provided an apparatus for managing transmission of a Cell-specific Reference Signal, CRS, comprising a plurality of reference symbols to User Equipment, UE, in a wireless communication system operating at least one cell or sector. The apparatus comprises:
an identification module for identifying a UE for which a beamformed transmission of data is scheduled during a transmission time interval, and
a control module for enabling, during the transmission time interval, beamformed transmission of at least part of the reference symbols of the CRS for targeting the identified UE.

It should though be understood that the proposed technology is not limited to the particular examples of LTE, but may be useful in a wide variety of radio communication systems having time-frequency resources for the air interface.

Other aspects and advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 17 is a schematic diagram illustrating an example of an antenna array used for beamforming.

FIG. 21 is a schematic diagram illustrating an example of an apparatus for managing transmission of a Cell-specific Reference Signal, CRS, comprising a plurality of reference symbols to User Equipment, UE, 20 in a wireless communication system operating at least one cell or sector, according to an embodiment.

DETAILED DESCRIPTION

Throughout the drawings, the same reference numbers are used for similar or corresponding elements.

As used herein, the term "network device" may refer to any device located in connection with a communication network, including but not limited to devices in access networks, core networks and similar network structures. The term network device may also encompass computer-based network devices such as cloud-based network devices for implementation in cloud-based environments.

As used herein, the non-limiting term "network node" may refer to any network node in a communication system including network nodes in access networks, core networks and similar network structures.

As used herein, the non-limiting terms "wireless communication device", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

With advanced antenna systems, beamforming employs multiple antennas to control the direction of a wave front by appropriately weighting the magnitude and phase of individual antenna signals. Normally UE specific transmissions are beamformed to increase coverage and capacity. However, the cell reference signals are generally not beamformed since they should normally cover the complete cell.

Figure 1:
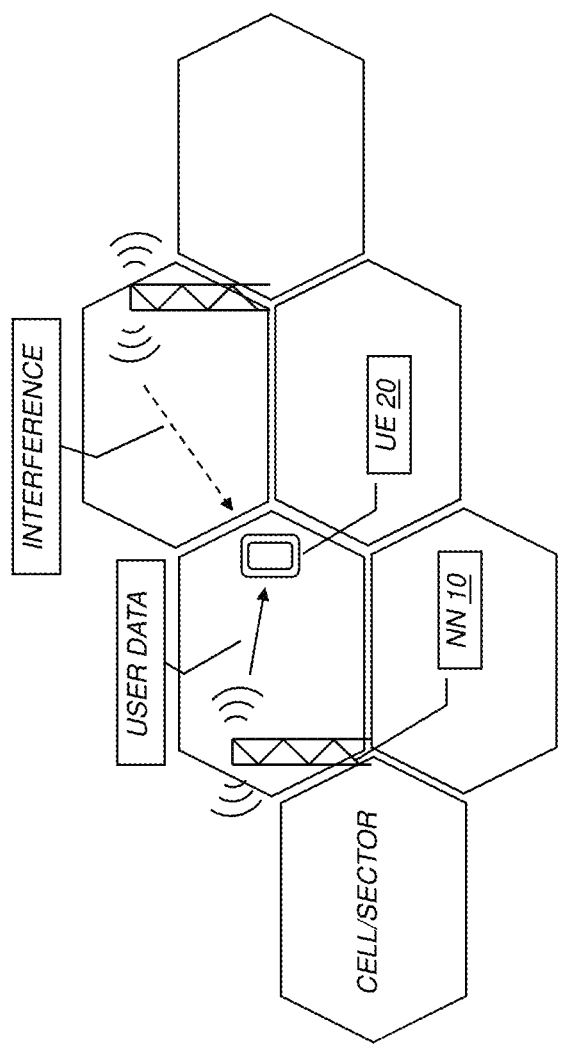
FIG. 1 is a schematic diagram of relevant parts of a wireless communication system in which data and control signaling, including reference signals, may cause interference between cells, so-called inter-cell interference.
Figure 2:
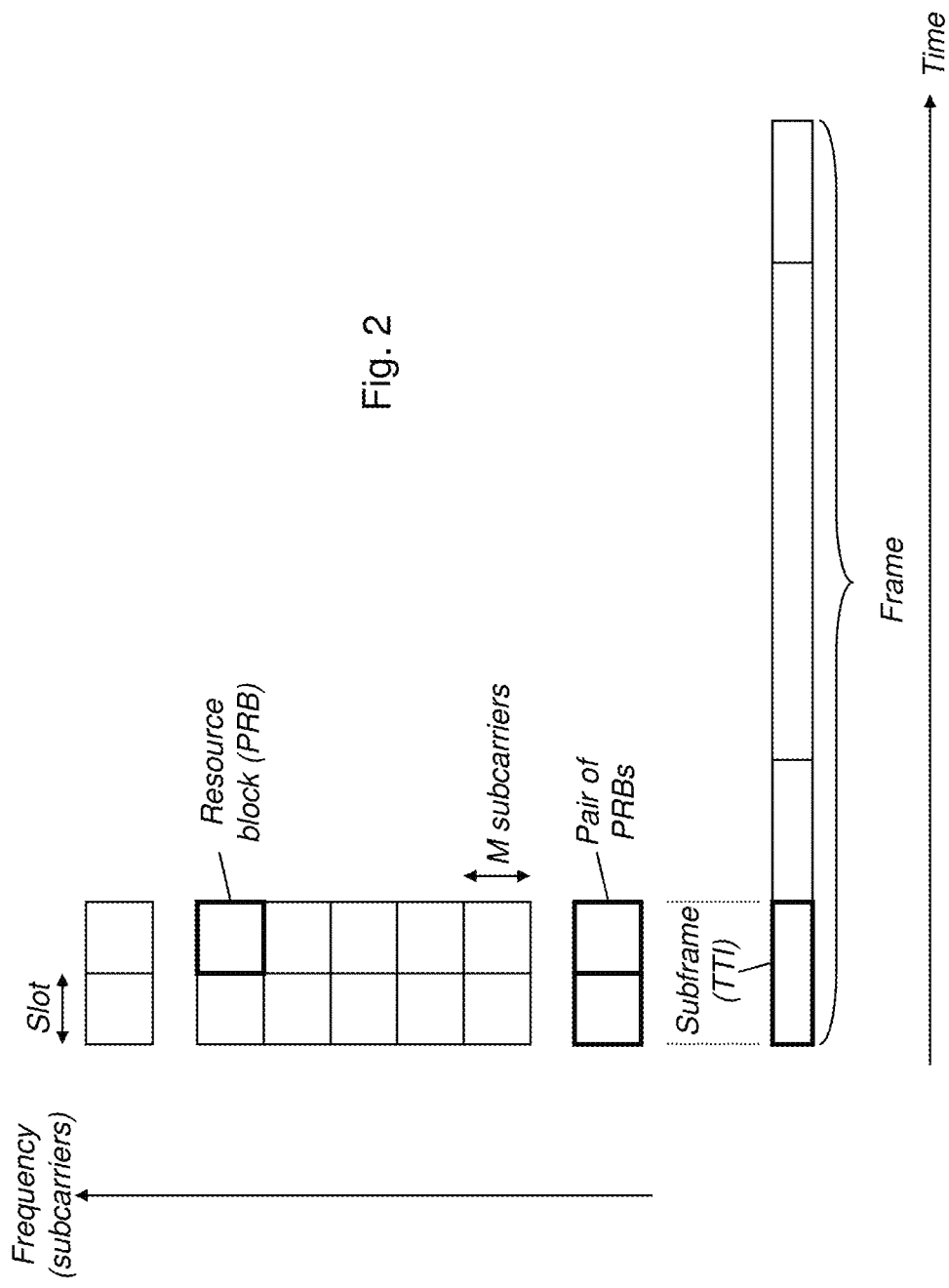
FIG. 2 is a schematic time-frequency diagram illustrating an example of the structure of the time-frequency resources for radio transmission.
Figure 3:
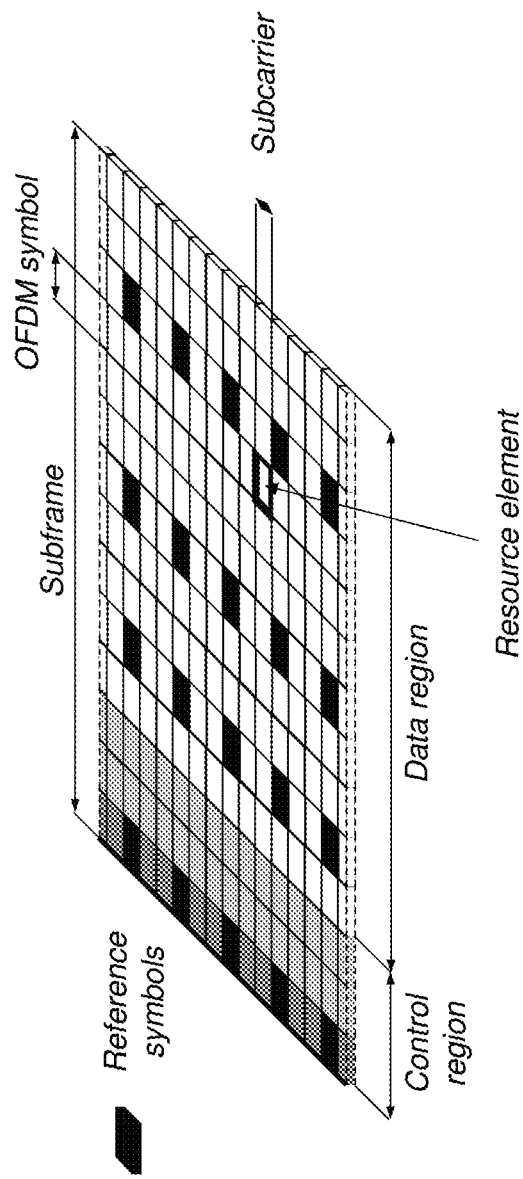
FIG. 3 is a schematic diagram illustrating a more detailed example of the structure of the time-frequency resources for a given subframe.
Figure 4:
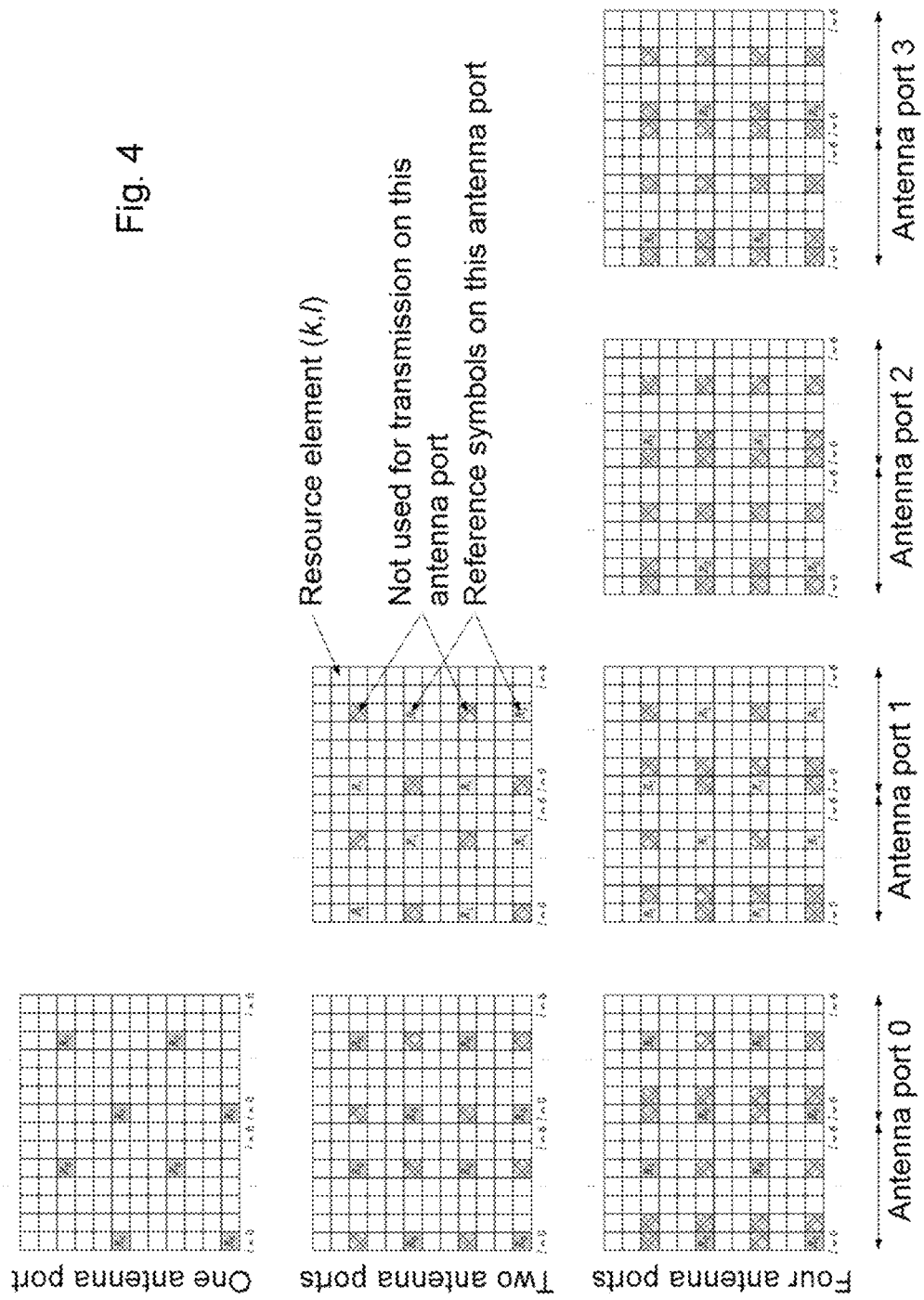
FIG. 4 is a schematic diagram illustrating an example of the mapping of reference symbols according to the 3GPP Technical Specification 36.211.
Figure 5:
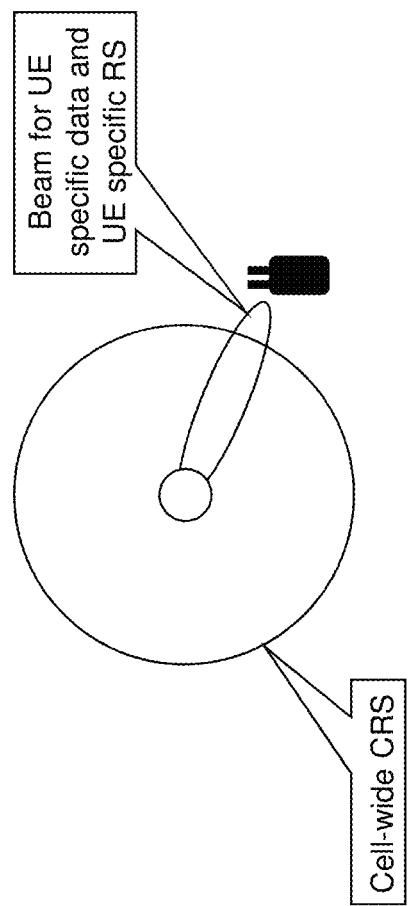
FIG. 5 is a schematic diagram illustrating an example of transmission of Cell-specific Reference Signal (CRS) in a modern wireless communication.

FIG. 5 is a schematic diagram illustrating an example of transmission of Cell-specific Reference Signal (CRS) in a modern wireless communication system such as LTE. The CRS is broadcasted cell-wide from the serving network node, such as an eNB, in order to reach the entire cell, whereas UE-specific data and UE-specific Reference Signals (RS) may be beamformed.

Figure 6:
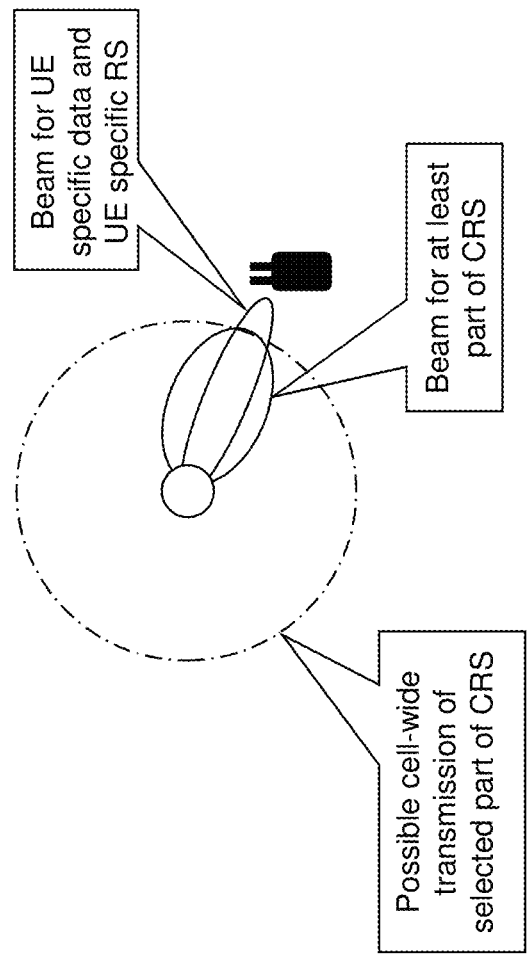
FIG. 6 is a schematic diagram illustrating an example of transmission of Cell-specific Reference Signal (CRS) according to an embodiment.

FIG. 6 is a schematic diagram illustrating an example of transmission of Cell-specific Reference Signal (CRS) according to an embodiment. In this example, not only UE-specific data and UE-specific RS, but also at least part of the CRS may be beamformed. It should also be understood, that this implies that it is still possible to perform cell-wide transmission of a selected part of the CRS.

Figure 7:
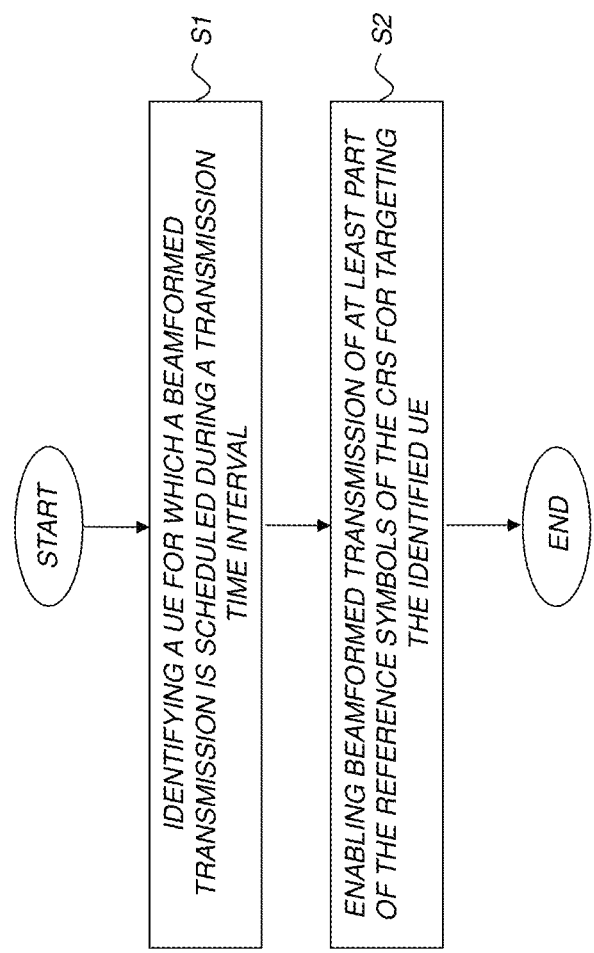
FIG. 7 is a schematic flow diagram illustrating an example of a method for managing transmission of a Cell-specific Reference Signal, CRS, comprising a plurality of reference symbols to User Equipment, UE, in a wireless communication system operating at least one cell or sector.

FIG. 7 is a schematic flow diagram illustrating an example of a method for managing transmission of a Cell-specific Reference Signal, CRS, comprising a plurality of reference symbols to User Equipment, UE, in a wireless communication system operating at least one cell or sector.

Basically, the method comprises:
S1: identifying a UE for which a beamformed transmission of data is scheduled during a transmission time interval, and
S2: enabling, during the transmission time interval, beamformed transmission of at least part of the reference symbols of the CRS for targeting the identified UE.

In this way, UE-specific beamforming of at least part of a Cell-specific Reference Signal, CRS may be provided, which in turn reduces the interference level and/or power consumption in the system. In particular, inter-cell interference may be significantly reduced and the power consumption may be reduced.

The proposed technology thus provides a way to reduce interference by beamforming Cell-specific CRSs.

Figure 8:
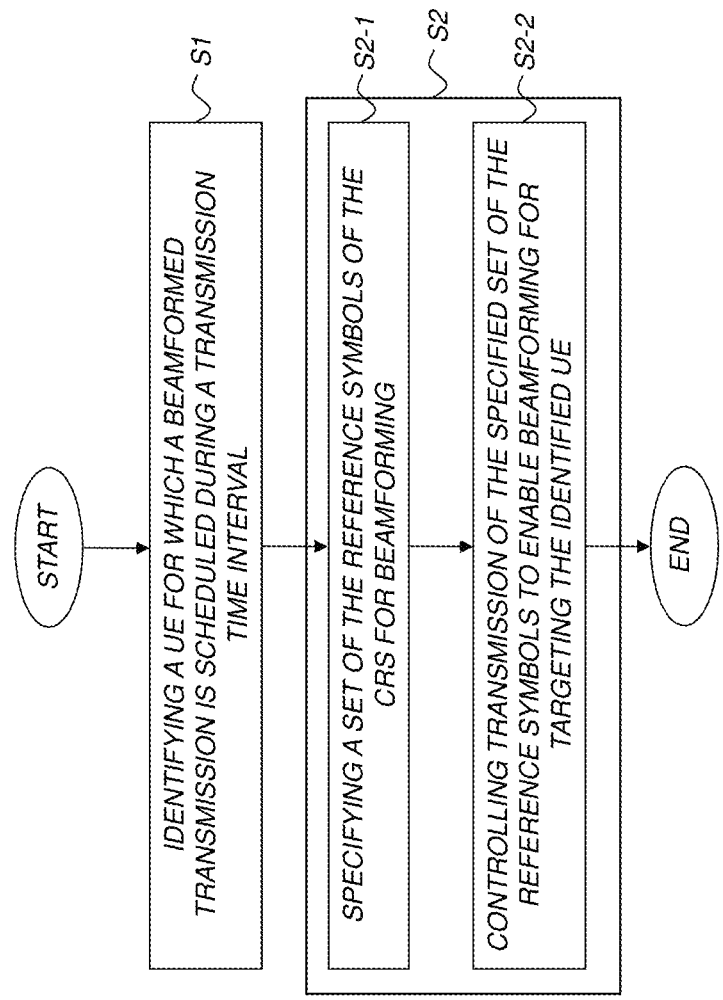
FIG. 8 is a schematic flow diagram illustrating an example of a method for managing transmission of a Cell-specific Reference Signal, CRS, according to a particular example embodiment.

FIG. 8 is a schematic flow diagram illustrating an example of a method for managing transmission of a Cell-specific Reference Signal, CRS, according to a particular example embodiment.

In the particular example of FIG. 8, the step S2 of enabling beamformed transmission of at least part of the reference symbols of the CRS comprises:
S2-1: specifying a set of the reference symbols of the CRS for beamforming; and
S2-2: controlling transmission of the specified set of the reference symbols of the CRS to enable beamforming for targeting the identified UE.

Figure 9:
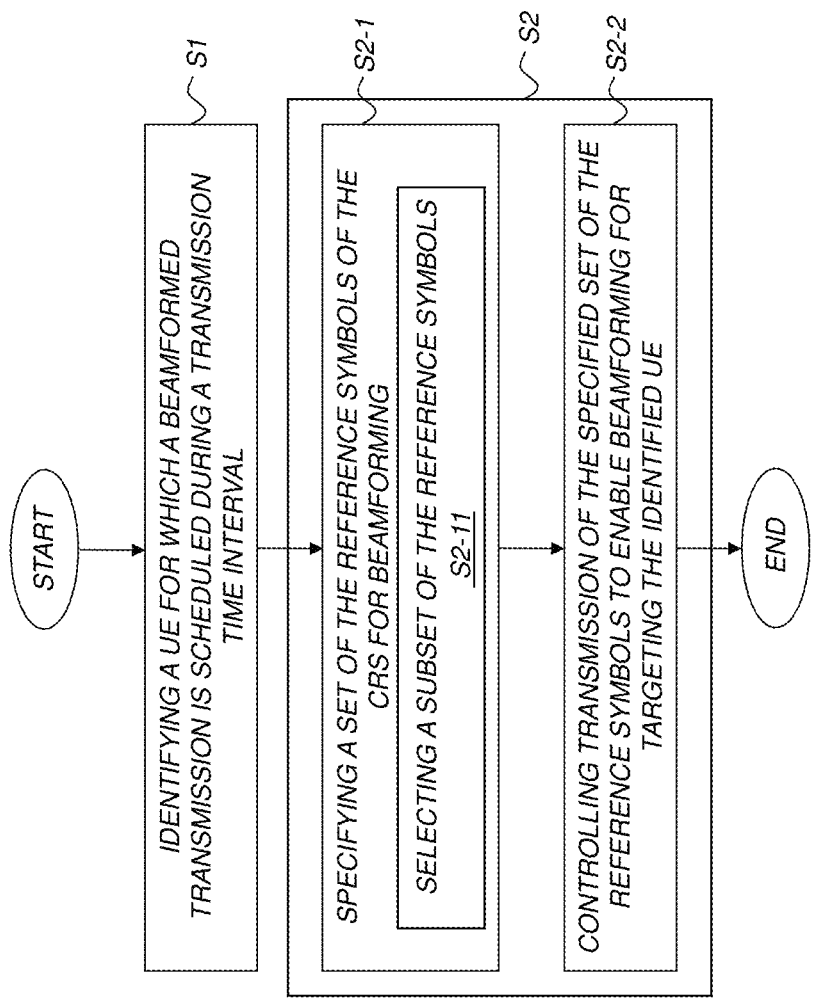
FIG. 9 is a schematic flow diagram illustrating an example of a method for managing transmission of a Cell-specific Reference Signal, CRS, according to another particular embodiment.

FIG. 9 is a schematic flow diagram illustrating an example of a method for managing transmission of a Cell-specific Reference Signal, CRS, according to another particular embodiment.

In the particular example of FIG. 9, the step S2-1 of specifying a set of the reference symbols of the CRS for beamforming comprises selecting S2-11 a subset of the reference symbols of the CRS for beamforming.

By way of example, the selected subset includes reference symbols in a selected subset of the frequency spectrum of the CRS.

Figure 10:
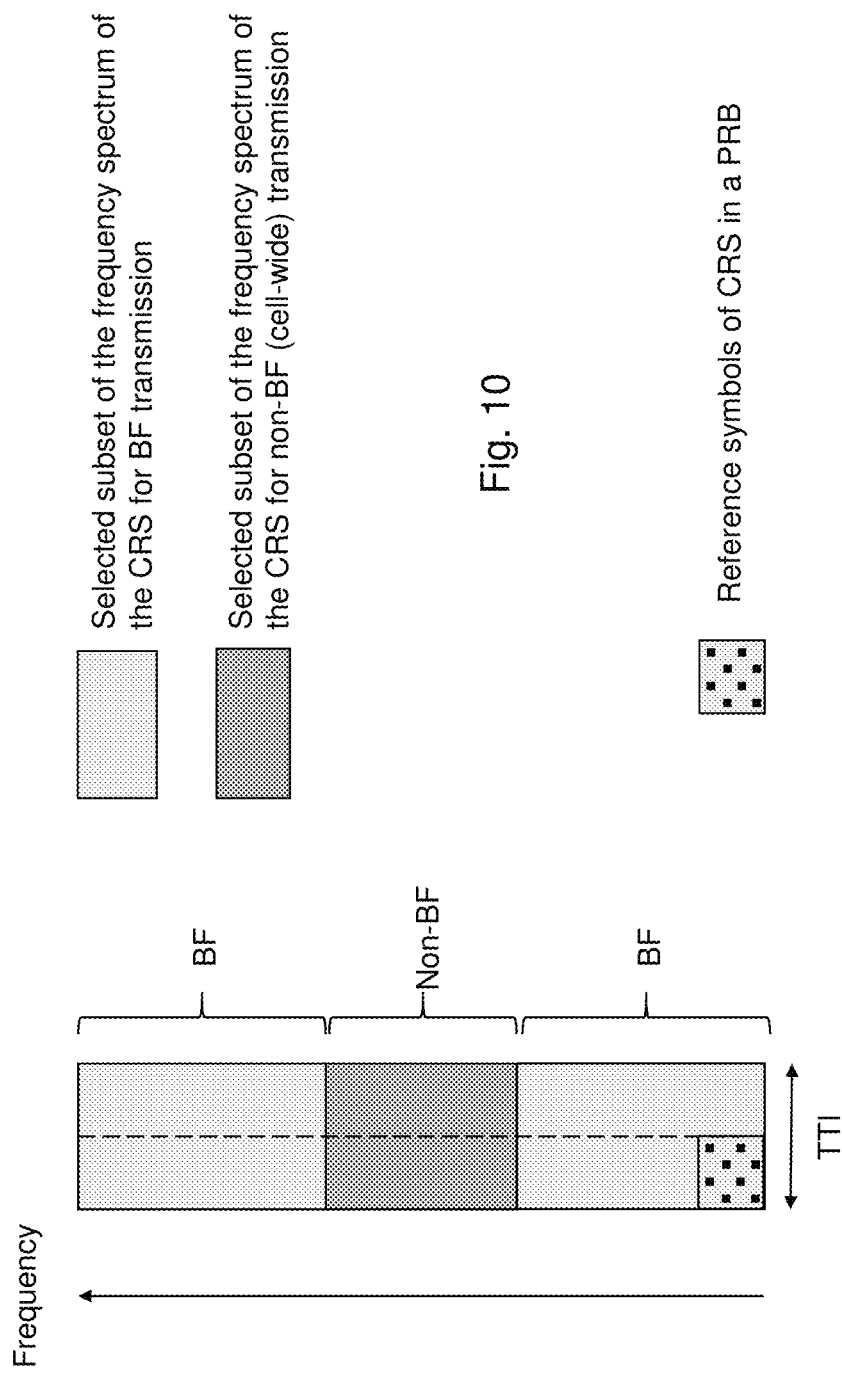
FIG. 10 is a schematic diagram illustrating an example of a selected subset of the frequency spectrum of the CRS for beamformed (BF) transmission, and a selected subset of the frequency spectrum of the CRS for non-beamformed (non-BF; cell-wide) transmission.

FIG. 10 is a schematic diagram illustrating an example of a selected subset of the frequency spectrum of the CRS for beamformed (BF) transmission, and a selected subset of the frequency spectrum of the CRS for non-beamformed (non-BF; cell-wide) transmission.

In the example of FIG. 10, the selected subset includes reference symbols within the available frequency spectrum of the CRS except for a number of Physical Resource Blocks, PRBs, located in the middle of the frequency spectrum. The reference symbols in the so-called center PRBs are preferably selected for cell-wide (non-BF) transmission.

Figure 11:
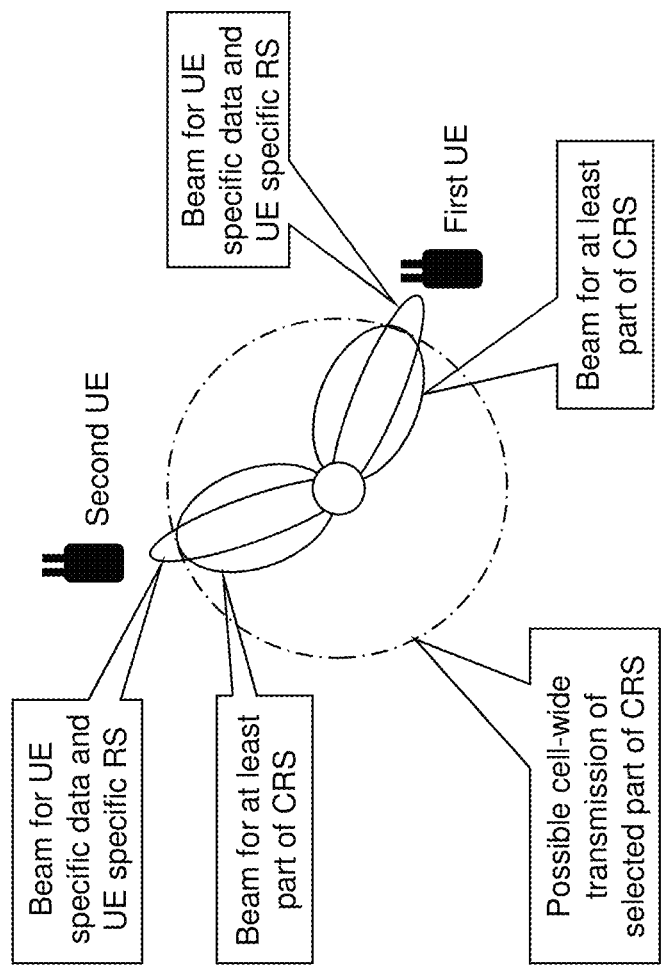
FIG. 11 is a schematic diagram illustrating an example of transmission of Cell-specific Reference Signal (CRS) according to yet another embodiment.

FIG. 11 is a schematic diagram illustrating an example of transmission of Cell-specific Reference Signal (CRS) according to yet another embodiment. In this example, the CRS is beamformed for targeting at least two different UEs, including a first UE and a second UE. For the first UE, a beam is provided for UE-specific data and UE-specific RS, and a beam is also provided for at least part of the CRS. For the second UE, a beam is provided for UE-specific data and UE-specific RS, and a beam is also provided for at least part of the CRS. It is still also possible to perform cell-wide transmission of a selected part of the CRS.

Figure 12:
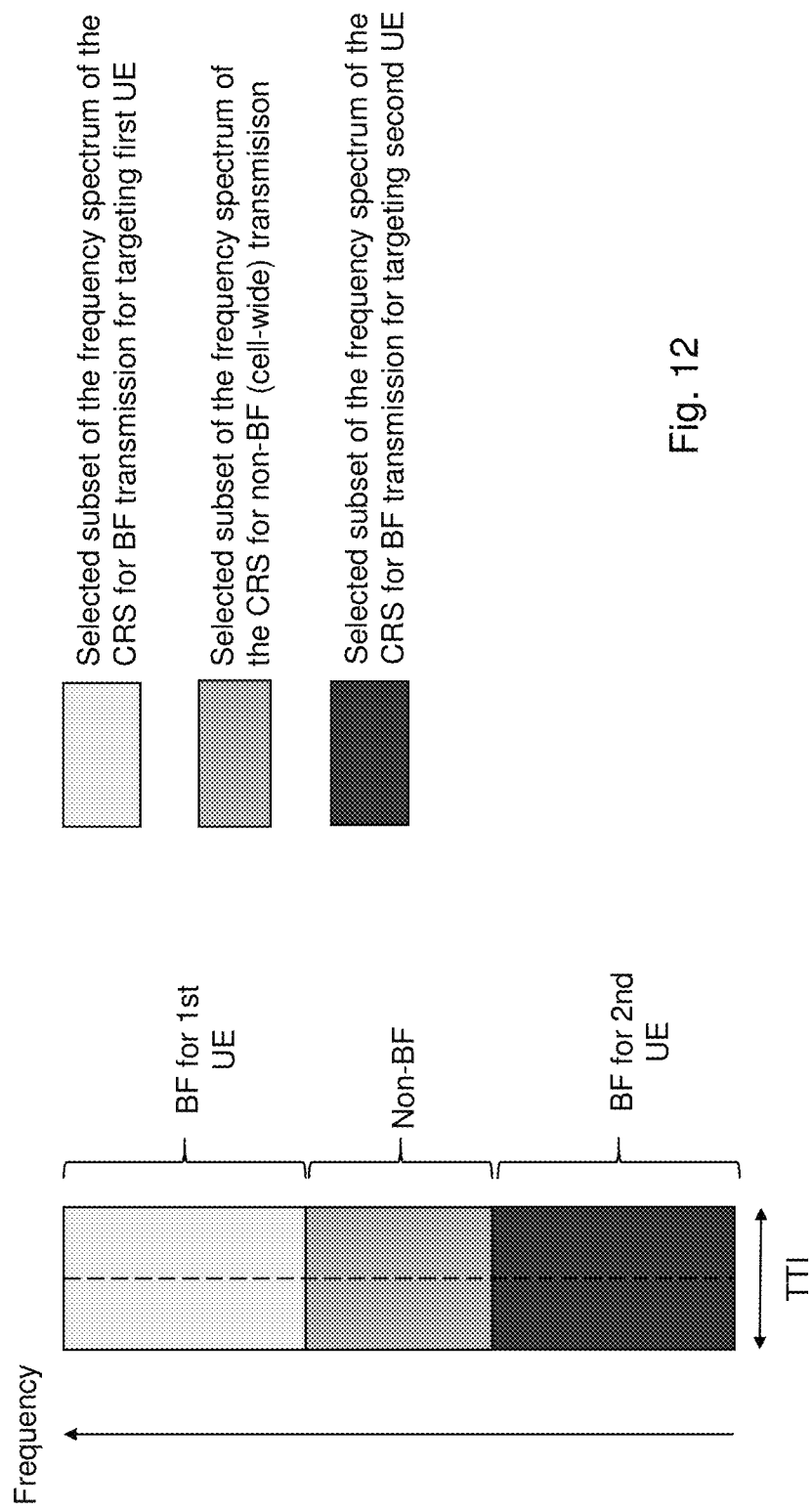
FIG. 12 is a schematic diagram illustrating an example of how two different UEs may use different parts of the frequency spectrum of the CRS for beamformed transmission.

FIG. 12 is a schematic diagram illustrating an example of how two different UEs may use different parts of the frequency spectrum of the CRS for beamformed transmission.

Figure 13:
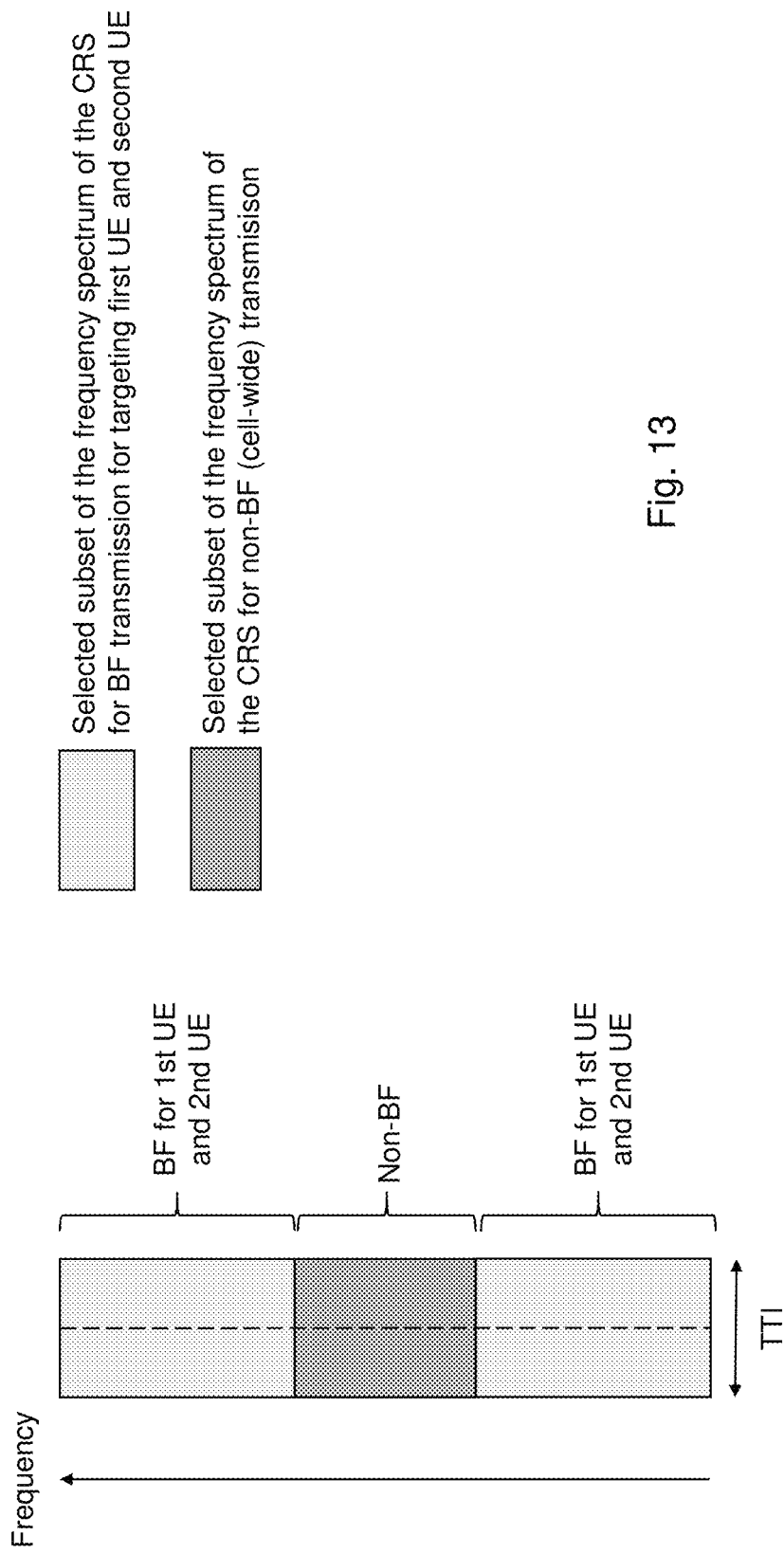
FIG. 13 is a schematic diagram illustrating an example of how two different UEs may use the same part(s) of the frequency spectrum of the CRS for beamformed transmission.

FIG. 13 is a schematic diagram illustrating an example of how two different UEs may use the same part(s) of the frequency spectrum of the CRS for beamformed transmission.

In the examples of FIG. 12 and FIG. 13, beamformed transmission of at least part of the reference symbols of the CRS is enabled for an identified UE (referred to as the first UE) in a part of the frequency spectrum of the CRS, and an additional UE (referred to as the second UE) for which a beamformed transmission of data is scheduled during the transmission time interval is also identified, and beamformed transmission of at least part of the reference symbols of the CRS is enabled for the additional UE in the same part (FIG. 13) or a different part (FIG. 12) of the frequency spectrum of the CRS.

Figure 14:
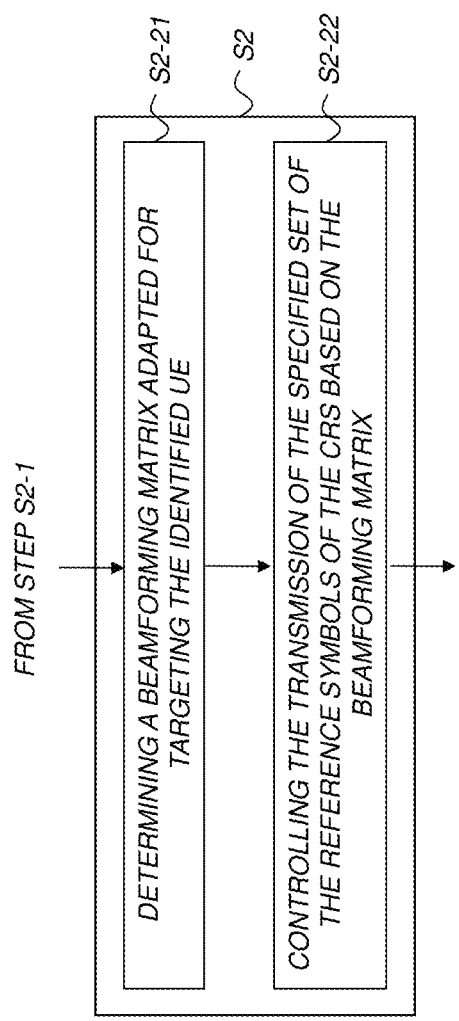
FIG. 14 is a schematic flow diagram illustrating an example of a method step for managing transmission of a Cell-specific Reference Signal, CRS, according to another embodiment.

FIG. 14 is a schematic flow diagram illustrating an example of a method step for managing transmission of a Cell-specific Reference Signal, CRS, according to another embodiment.

In the example of FIG. 14, the step S2-2 of controlling transmission of the specified set of the reference symbols of the CRS to enable beamforming for targeting the identified UE comprises:
S2-21: determining a beamforming matrix adapted for targeting the identified UE,
S2-22: controlling the transmission of the specified set of the reference symbols of the CRS based on the beamforming matrix.

The concepts described above may optionally be combined with one or more additional conditions for beamformed transmission of the CRS or part(s) thereof.

By way of example, the beamformed transmission of at least part of the reference symbols of the CRS may be enabled during the transmission time interval only if, for the cell or sector associated with the CRS:

no paging occasion occurs during the transmission time interval or a time window in connection with the transmission time interval;

no system information is to be transmitted during the transmission time interval or a time window in connection with the transmission time interval;

no Discontinuous Reception, DRX, On Duration interval is overlapping with the transmission time interval or a time window in connection with the transmission time interval; and no UE is scheduled for non-beamformed transmission of data during the transmission time interval or a time window in connection with the transmission time interval.

For example, the time window in connection with the transmission time interval may include one or more preceding and/or subsequent transmission time intervals.

Figure 15:
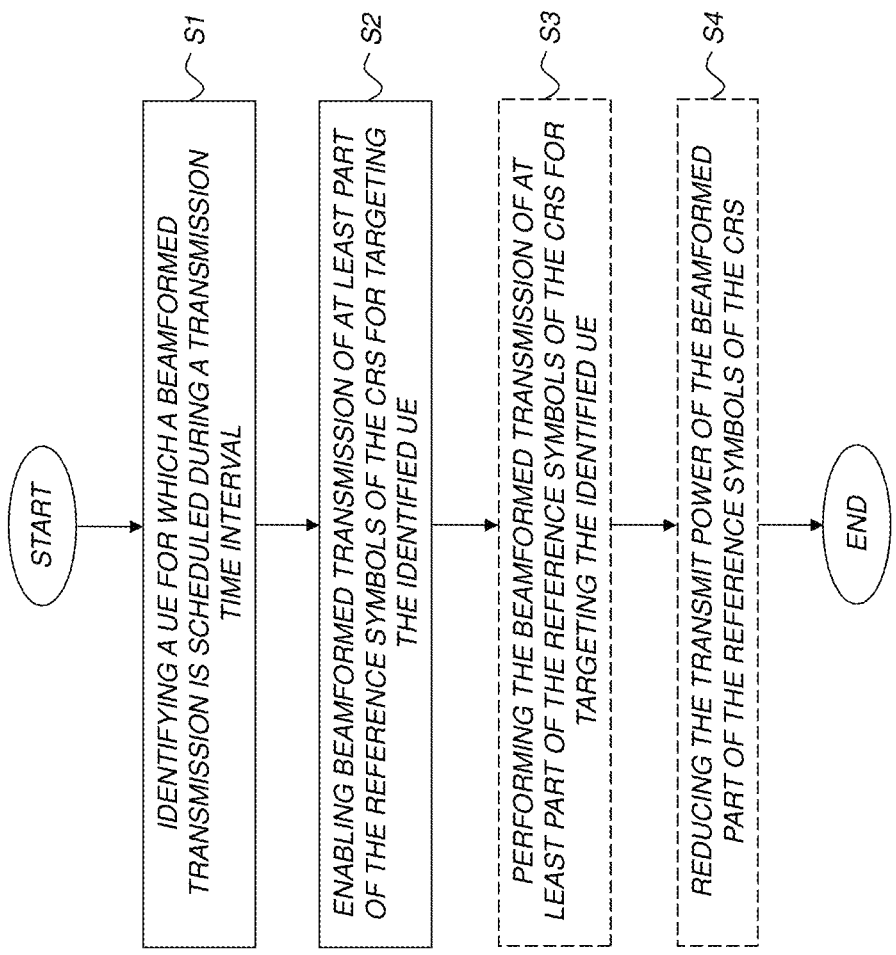
FIG. 15 is a schematic flow diagram illustrating an example of a method for managing transmission of a Cell-specific Reference Signal, CRS, according to yet another example embodiment.

FIG. 15 is a schematic flow diagram illustrating an example of a method for managing transmission of a Cell-specific Reference Signal, CRS, according to yet another example embodiment.

For example, the method may further comprise the step S3 of performing the beamformed transmission of at least part of the reference symbols of the CRS for targeting the identified UE.

Optionally, the method further comprises the step S4 of reducing the transmit power of the beamformed part of the reference symbols of the CRS.

As an example, the transmit power may be reduced when performing beamformed transmission of at least part of the CRS such that the reference signal received power as measured by the UE is on the same level regardless of beamformed transmission of CRS or non-beamformed transmission of CRS.

In general, and applicable to all flow diagrams described herein, the step S2 of enabling beamformed transmission may comprise triggering, performing preparations for and/or controlling the beamformed transmission.

Figure 16:
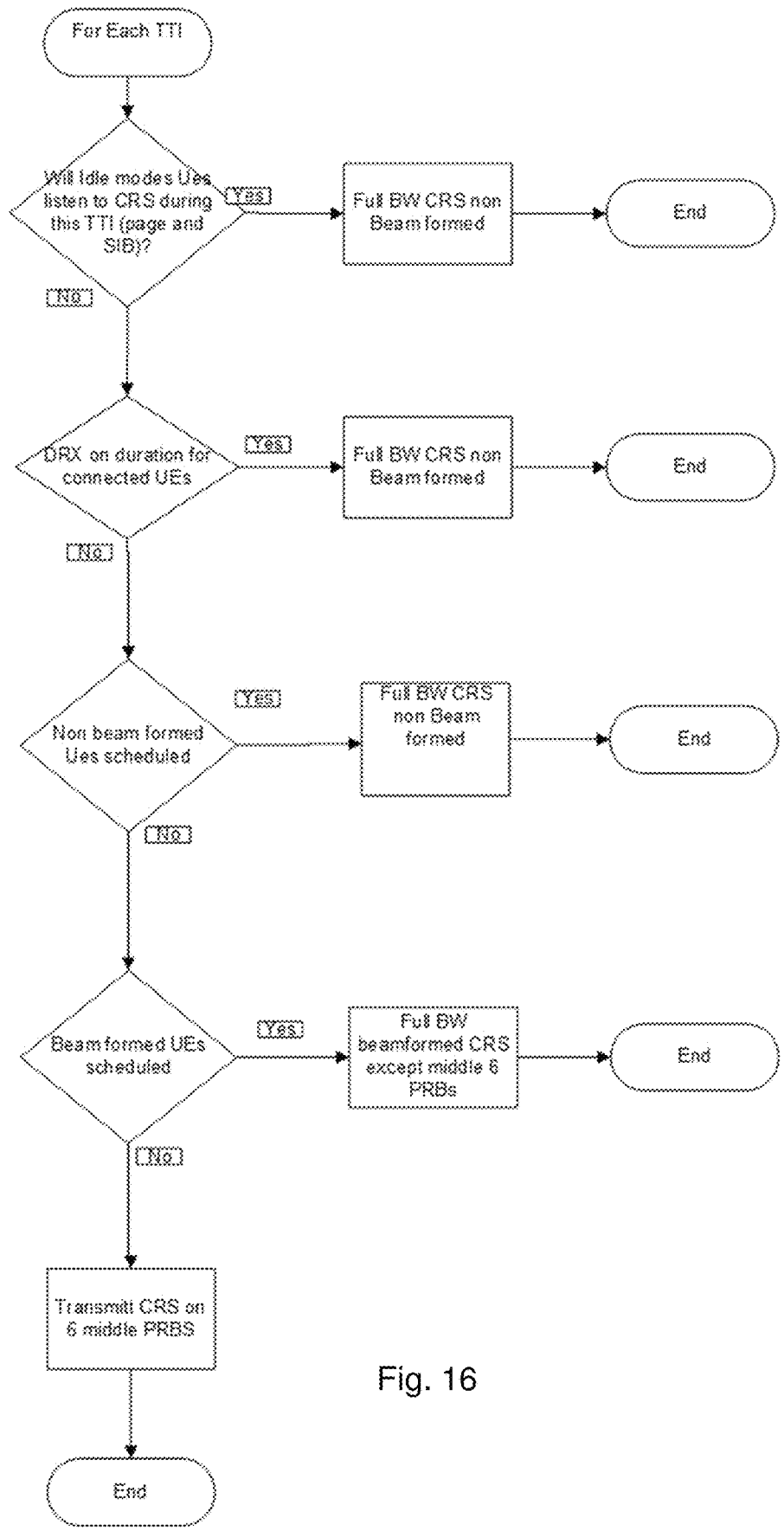
FIG. 16 is a schematic flow diagram illustrating an example of determining how CRSs should be transmitted according to an example embodiment.

FIG. 16 is a schematic flow diagram illustrating an example of determining how CRSs should be transmitted according to an example embodiment.

According to particular example illustrated in the flow diagram of FIG. 16, the network transmits CRS in full bandwidth (BW) and non-beamformed (i.e. cell wide), triggered by any of the following conditions:

a paging occasion, a System Information Block (SIB) transmission, and/or

UEs in DRX on duration.

If any of the above conditions are fulfilled the CRS will thus be sent in full BW and non-beamformed (cell-wide). This corresponds to the conditions for sending full BW CRS in the current Ericsson Lean Carrier solution, e.g. as described in WO 2016/071010 and WO 2016/032381, with the exception of UE-specific transmissions.

For non-beamformed UE specific transmissions (e.g. PDSCH, PDCCH), full BW CRSs are sent non-beamformed as in the current Ericsson Lean Carrier solution. However, for beamformed UE-specific transmission (e.g. PDSCH, PDCCH), at least part of the CRSs are also beamformed to reduce interference to neighboring cells. This allows CRS interference to be reduced even when UEs are scheduled.

Preferably, the CRSs are beamformed, except for the reference symbols of a number N of the middlemost PRBs, e.g. the 6 middle PRBs. The considered middle PRBs are normally transmitted non-beamformed (cell wide). This is due to the fact that when a UE has selected a cell in RRC idle mode, measurements on neighboring cells must adhere to the IE AllowedMeasBandwidth in the system information. This is typically set to 6 PRBs.

The beamforming of CRSs could be done using the same beamforming as for the UE (PDCCH, PDSCH, PHICH) transmission or by using several semi-wide fixed beams each covering a subpart of the sector or cell.

When doing beamforming of CRSs it is normally important that the RSRP measured by the UEs is not impacted by the beamforming. This can be handled by reducing the transmitted power of the CRSs so that the RSRP measured by the UE is constant regardless of receiving beamformed CRSs or non-beamformed CRSs. With this approach the average CRS interference to neighbouring cells will be reduced. Since RSRP measured by the UE will not be impacted there will not be any impact to handover borders between cells.

FIG. 17 is a schematic diagram illustrating an example of an antenna array used for beamforming. To explain the beamforming concept consider FIG. 17 which shows an idealized one-dimensional beamforming case. In case it is assumed that the UE is located far away from the antenna array it follows that the difference in travel distance from the base station to the UE, between adjacent antenna elements, is defined as:

$$l = k\lambda \sin(\theta),$$

where $k\lambda$ is the antenna element separation. Here k is the separation factor which may be 0.5-0.7 in a typical correlated antenna element arrangement. This means that if a reference signal $s_i e^{j\omega t}$ transmitted from the i:th antenna element will arrive at the UE antenna as a weighted sum:

$$s_{UE} = \sum_{i=0}^{N-1} s_i h_i e^{j\omega\left(t-\frac{il}{c}\right)} = e^{j\omega t}\sum_{i=1}^{N-1} s_i h_i e^{-j\frac{ik\lambda \sin(\theta)}{f_c\lambda}} = e^{j\omega t}\sum_{i=1}^{N-1} s_i h_i e^{-j\frac{ik\sin(\theta)}{f_c}}.$$

Here $\omega$ is the angular carrier frequency, $h_i$ is the complex channel from the i:th antenna element, t is the time, and $f_c$ is the carrier frequency. In the above equation $\theta$ and $h_i$ are unknown. In case of a feedback solution, the UE therefore needs to search for all complex channel coefficients $h_i$ and the unknown angle $\theta$. For this reason the standard defines a codebook of beams in different directions given by steering vector coefficients like:

$$w_{m,i} = e^{-jf(m,i)}$$

where m indicates a directional codebook entry. The UE then tests each codebook and estimates the channel coefficients. The information rate achieved for each codebook entry m is computed and the best one defines the direction and channel coefficients. This is possible since $s_i$ is known. The result is encoded and reported back to the base station. This provides the base station with a best direction (codebook entry) and information that allows it to build up a channel matrix H. This matrix represents the channel from each of the transmit antenna elements to each of the receive antenna elements. Typically, each element of H is represented by a complex number.

The channel matrix can then be used for beamforming computations, or the direction represented by the reported codebook entry can be used directly. In case of MIMO transmission the MIMO beamforming weight matrix W needs to be determined so that a best match to the requirement WH=I is achieved where I denotes the identity matrix.

In case of an exact match each layer will become independent of other layers. This concept can be applied for single users or multiple users.

As stated above the codebook of the 3GPP standard is defined to represent certain directions. In release 13, directions in both azimuth and elevation is defined, thereby allowing 2D beamforming to be used. These 4G codebooks are specified in detail in 3GPP TR 36.897.

In order to illustrate that the codebooks indeed define specific directions, it can be noted that the formula for the azimuth codebook is:

$$w_k = \frac{1}{\sqrt{K}} \exp\left(-j\frac{2\pi}{\lambda}(k-1)d_V \cos\theta_{etilt}\right) \text{ for } k = 1, \ldots, K.$$

It has the same structure as discussed above. Similarly, the vertical codebook in that document is given by:

$$v_{l,i} = \frac{1}{\sqrt{L}} \exp\left(-j\frac{2\pi}{\lambda}(l-1)d_H \sin\vartheta_i\right) \text{ for } l = 1, \ldots, L.$$

In the two above equations it is only the structure that is needed here, the details of the involved quantities is of less importance and is not reproduced here, see 3GPP TR 36.897 for all details. Finally, it is noted that a 2D beam is obtained by a multiplication of the two above equations.

What is particularly important for the present invention is that a specific reference signal may be transmitted on a set of well-defined antenna ports, a fact that allows reference signals to be separately beam-formed.

As a side note, channel reciprocity is a consequence of Maxwell's Equations. Given two nodes equipped with antenna arrays that communicate in a single frequency band, the channel reciprocity property means that at any given point in time, the complex channel coefficient between any transmitting antenna element in one node and any receiving antenna element in the other node, is the same in the uplink and the downlink. The channel matrix remains the same between the antenna arrays of the two nodes when the direction of the transmission is reversed. The two nodes may typically be a UE and an eNB. It is essential to note that the time is assumed to be essentially the same for the two directions of transmission.

To exploit reciprocity, the channel coefficients can be directly estimated by the base station from UE uplink transmission of known pilot signals, so called sounding reference signals, SRSs. The estimated channel can then be used to compute the combining weight matrix according to some selected principle, and then used for downlink transmission. This works since the uplink and downlink channels are the same when reciprocity is applicable.

However, an important restriction is that the locations of the antenna arrays and the rest of the radio environment remains the same during the time reciprocity based transmission is applied. This is e.g. not the case in case of UE motion (mobility). As a rule of thumb, the channel de-correlates for UE movement of about 0.4 wavelengths. This means that for a given UE mobility, the higher the carrier frequency, the less is the duration of time during which reciprocity holds. After de-correlation new SRS measurements are needed and a renewed beamforming solution needs to be computed.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to a second aspect, there is provided an arrangement configured to manage transmission of a Cell-specific Reference Signal, CRS, comprising a plurality of reference symbols to User Equipment, UE, in a wireless communication system operating at least one cell or sector.

The arrangement is configured to identify a UE for which a beamformed transmission of data is scheduled during a transmission time interval, and the arrangement is also configured to enable, during the transmission time interval, beamformed transmission of at least part of the reference symbols of the CRS for targeting the identified UE.

By way of example, the arrangement may be configured to specify a set of the reference symbols of the CRS for beamforming, and control transmission of the specified set of the reference symbols of the CRS to enable beamforming for targeting the identified UE.

For example, the arrangement may be configured to select a subset of the reference symbols of the CRS for beamforming.

In particular example, the selected subset is defined by reference symbols in a selected subset of the frequency spectrum of the CRS.

As an example, the selected subset includes reference symbols within the available frequency spectrum of the CRS except for a number of Physical Resource Blocks, PRBs, located in the middle of the frequency spectrum.

Optionally, the arrangement may be configured to enable beamformed transmission of at least part of the reference symbols of the CRS for the identified UE in a part of the frequency spectrum of the CRS, and identify an additional UE for which a beamformed transmission of data is scheduled during the transmission time interval, and enable beamformed transmission of at least part of the reference symbols of the CRS for the additional UE in the same part or a different part of the frequency spectrum of the CRS.

According to a particular example, the arrangement may be configured to control transmission of the specified set of the reference symbols of the CRS to enable beamforming for targeting the identified UE by determining a beamforming matrix adapted for targeting the identified UE, and controlling the transmission of the specified set of the reference symbols of the CRS based on the beamforming matrix.

In an optional embodiment, the arrangement is configured to enable the beamformed transmission of at least part of the reference symbols of the CRS during the transmission time interval only if, for the cell or sector associated with the CRS:

no paging occasion occurs during the transmission time interval or a time window in connection with the transmission time interval;

no system information is to be transmitted during the transmission time interval or a time window in connection with the transmission time interval;

no Discontinuous Reception, DRX, On Duration interval is overlapping with the transmission time interval or a time window in connection with the transmission time interval; and no UE is scheduled for non-beamformed transmission of data during the transmission time interval or a time window in connection with the transmission time interval.

For example, the time window in connection with the transmission time interval may include one or more preceding and/or subsequent transmission time intervals.

The arrangement may also be configured to perform the beamformed transmission of at least part of the reference symbols of the CRS for targeting the identified UE.

Optionally, the arrangement may also be configured to reduce the transmit power of the beamformed part of the reference symbols of the CRS.

As an example, the arrangement is configured to reduce the transmit power when performing beamformed transmission of at least part of the CRS such that the reference signal received power as measured by the UE is on the same level regardless of beamformed transmission of CRS or non-beamformed transmission of CRS.

By way of example, the arrangement may be configured to enable beamformed transmission by triggering, performing preparations for and/or controlling the beamformed transmission.

In a particular implementation example, the arrangement comprises processing circuitry and memory, the memory comprising instructions, which when executed by the processing circuitry, cause the arrangement to manage transmission of the CRS.

Figure 18C:
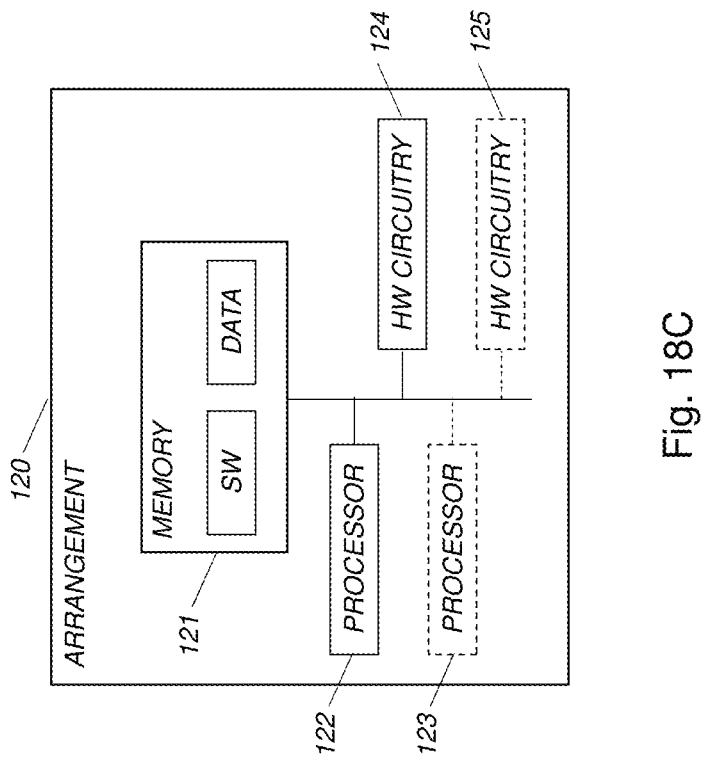
FIG. 18C is a schematic block diagram illustrating an example of an arrangement configured to manage transmission of a Cell-specific Reference Signal, CRS, according to yet another embodiment.
Figure 18A:
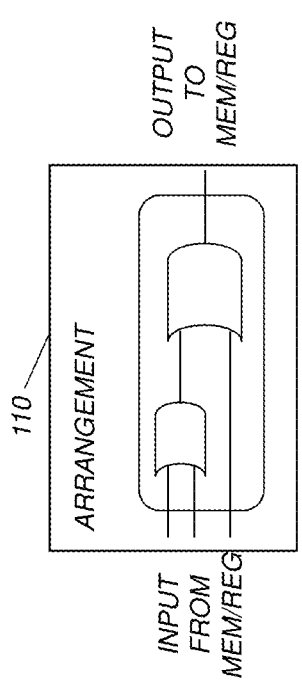
FIG. 18A is a schematic block diagram illustrating an example of an arrangement configured to manage transmission of a Cell-specific Reference Signal, CRS, according to an embodiment.

FIG. 18A is a schematic block diagram illustrating an example of an arrangement configured to manage transmission of a Cell-specific Reference Signal, CRS, according to an embodiment. In this particular example, the arrangement 100 comprises a processor 101 and a memory 102, the memory 102 comprising instructions executable by the processor 101, whereby the processor is operative to perform the functions described herein.

Optionally, the arrangement 100 may also include an input/output (I/O) unit 103. The I/O unit 103 may include functions for wired and/or wireless communication with other devices and/or network nodes in the network. In a particular example, the I/O unit 103 may be based on radio circuitry for communication with one or more other nodes, including transmitting and/or receiving information. The I/O unit 103 may be interconnected to the processor 101 and/or memory 102. By way of example, the I/O unit 103 may include any of the following: a receiver, a transmitter, a transceiver, input port(s) and/or output port(s).

Figure 18B:
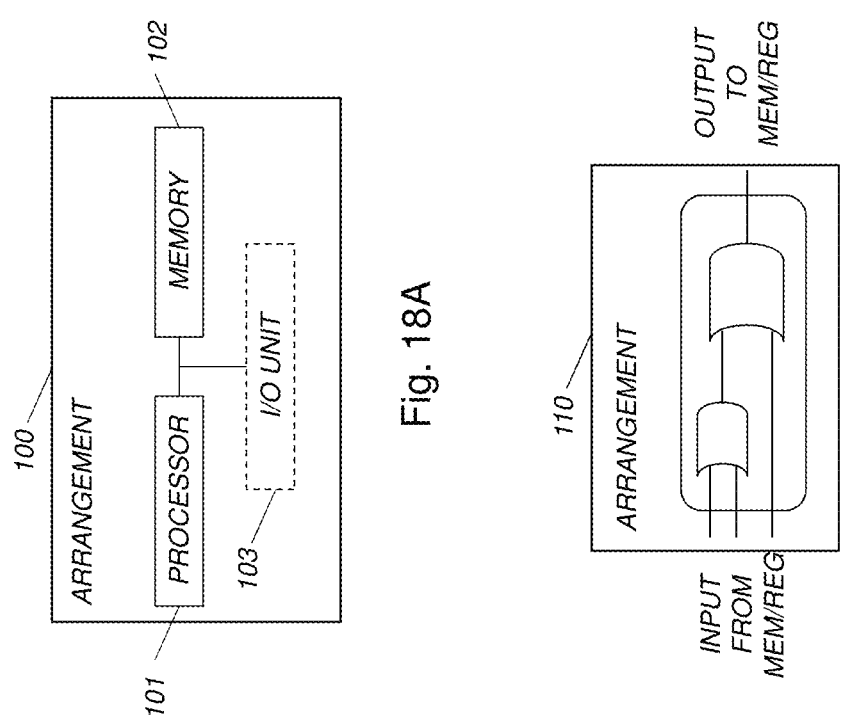
FIG. 18B is a schematic block diagram illustrating an example of an arrangement configured to manage transmission of a Cell-specific Reference Signal, CRS, according to another embodiment.

FIG. 18B is a schematic block diagram illustrating an example of an arrangement configured to manage transmission of a Cell-specific Reference Signal, CRS, according to another embodiment.

In this example, the arrangement 110 is based on a hardware circuitry implementation. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

FIG. 18C is a schematic block diagram illustrating an example of an arrangement configured to manage transmission of a Cell-specific Reference Signal, CRS, according to yet another embodiment. In this example, the arrangement 120 is based on a combination of both processor(s) 122, 123 and hardware circuitry 124, 125 in connection with suitable memory unit(s) 121. The arrangement 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 19:
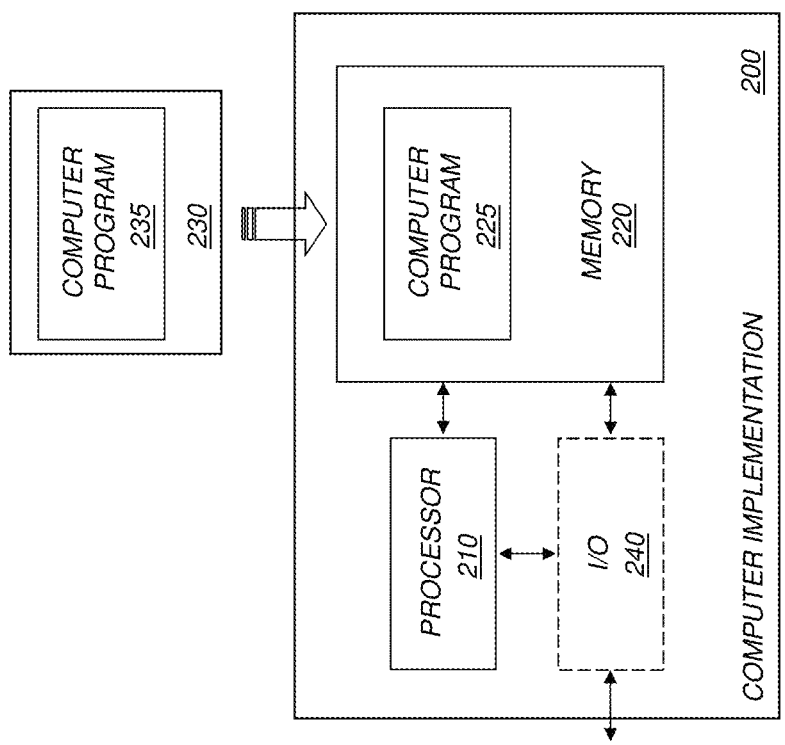
FIG. 19 is a schematic block diagram illustrating an example of a network device according to an embodiment.

FIG. 19 is a schematic diagram illustrating an example of a computer-implementation 200 according to an embodiment. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

The processing circuitry does not have to be dedicated to only execute the above-described steps, functions, procedure and/or blocks, but may also execute other tasks.

In a particular embodiment, the computer program 225; 235 comprises instructions, which when executed by at least one processor 210, cause the processor(s) 210 to perform the actions described herein.

According to another aspect, there is provided a computer program 225; 235 comprising instructions, which when executed by at least one processor 210, cause the at least one processor 210 to:

identify a User Equipment, UE, for which a beamformed transmission of data is scheduled during a transmission time interval, and enable, during the transmission time interval, beamformed transmission of at least part of the reference symbols of a Cell-specific Reference Signal, CRS, for targeting the identified UE.

According to yet another aspect, there is provided a computer program product comprising a computer-readable medium 220; 230 in which a computer program 225; 235 of the above aspect is stored.

The proposed technology thus provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 20:
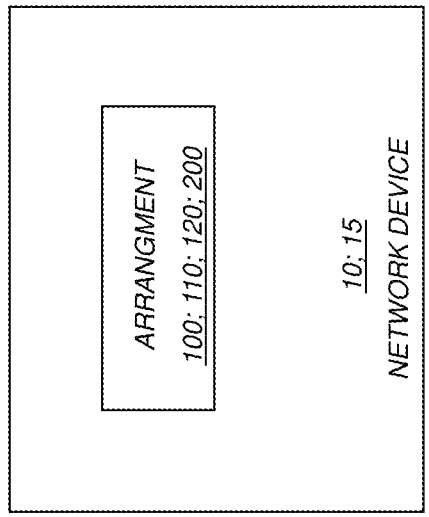
FIG. 20 is a schematic diagram illustrating an example of a computer-implementation according to an embodiment.

FIG. 20 is a schematic block diagram illustrating an example of a network device according to an embodiment. The network device 10; 15 comprises an arrangement 100; 110; 120; 200 according to the second aspect of the proposed technology described above.

By way of example, the network device 10; 15 may be a network node 10 or a cloud-based network device 15.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

FIG. 21 is a schematic diagram illustrating an example of an apparatus 300 for managing transmission of a Cell-specific Reference Signal, CRS, comprising a plurality of reference symbols to User Equipment, UE, 20 in a wireless communication system operating at least one cell or sector. The apparatus 300 comprises:

an identification module 310 for identifying a UE for which a beamformed transmission of data is scheduled during a transmission time interval, and a control module 320 for enabling, during the transmission time interval, beamformed transmission of at least part of the reference symbols of the CRS for targeting the identified UE.

Alternatively it is possible to realize the module(s) in FIG. 21 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is also becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

Figure 22:
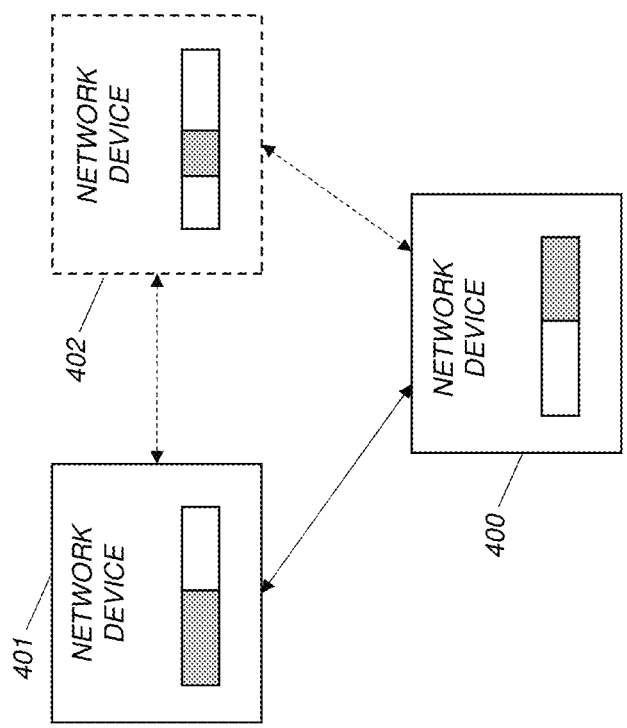
FIG. 22 schematically illustrates a distributed implementation among network devices.

FIG. 22 is a schematic diagram illustrating an example of how functionality can be distributed or partitioned between different network devices in a general case. In this example, there are at least two individual, but interconnected network devices 400, 401, which may have different functionalities, or parts of the same functionality, partitioned between the network devices 400, 401. There may be additional network devices 402 being part of such a distributed implementation. The network devices 400, 401, 402 may be part of the same wireless or wired communication system, or one or more of the network devices may be so-called cloud-based network devices located outside of the wireless or wired communication system.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for managing transmission of a Cell-specific Reference Signal, CRS, comprising a plurality of reference symbols in a wireless communication system operating at least one cell or sector, wherein said method comprises:
   identifying a user equipment, UE, for which a beamformed transmission of data is scheduled during a transmission time interval,
   selecting a subset of the plurality of reference symbols of the CRS of the least one cell or sector for beamforming, and
   controlling transmission of the subset of the plurality of reference symbols of the CRS to enable beamforming for targeting the identified UE,
   wherein the selected subset includes reference symbols within the available frequency spectrum of the CRS except for a number of Physical Resource Blocks, PRBs, located in the middle of the frequency spectrum.

2. The method of claim 1, wherein the subset includes reference symbols in a selected subset of the frequency spectrum of the CRS.

3. The method of claim 2, wherein beamformed transmission of at least part of the plurality of reference symbols of the CRS is enabled for the identified UE in a part of the frequency spectrum of the CRS, and wherein an additional UE for which a beamformed transmission of data is scheduled during the transmission time interval is also identified, and beamformed transmission of at least part of the plurality of reference symbols of the CRS is enabled for the additional UE in the same part or a different part of the frequency spectrum of the CRS.

4. The method of claim 1, wherein the step of controlling transmission of the specified set of the plurality of reference symbols of the CRS to enable beamforming for targeting the identified UE comprises:
determining a beamforming matrix adapted for targeting the identified UE, and
controlling the transmission of the specified set of the plurality of reference symbols of the CRS based on the beamforming matrix.

5. The method of claim 1, wherein the beamformed transmission of at least part of the plurality of reference symbols of the CRS is enabled during the transmission time interval only if, for the cell or sector associated with the CRS:
no paging occasion occurs during the transmission time interval or a time window in connection with the transmission time interval;
no system information is to be transmitted during the transmission time interval or a
time window in connection with the transmission time interval;
no Discontinuous Reception, DRX, On Duration interval is overlapping with the transmission time interval or a time window in connection with the transmission time interval; and
no UE is scheduled for non-beamformed transmission of data during the transmission time interval or a time window in connection with the transmission time interval.

6. The method of claim 5, wherein the time window in connection with the transmission time interval includes one or more preceding and/or subsequent transmission time intervals.

7. The method of claim 1, wherein the method further comprises performing the beamformed transmission of at least part of the plurality of reference symbols of the CRS for targeting the identified UE.

8. The method of claim 1, wherein the PRBs located in the middle of the frequency spectrum are associated with non-beamforming CRS transmissions.

9. The method of claim 1, wherein the subset of the plurality of reference symbols of the CRS of the least one cell or sector are associated with a fixed beam of the at least one cell covering a subpart of the least one cell or sector.

10. A method for managing transmission of a Cell-specific Reference Signal, CRS, comprising a plurality of reference symbols in a wireless communication system operating at least one cell or sector, wherein said method comprises:
identifying a user equipment, UE, for which a beamformed transmission of data is scheduled during a transmission time interval,
selecting a subset of the plurality of reference symbols of the CRS of the least one cell or sector for beamforming,
controlling transmission of the subset of the plurality of reference symbols of the CRS to enable beamforming for targeting the identified UE, and
reducing the transmit power of the beamformed part of the subset of the plurality of reference symbols of the CRS,
wherein the transmit power is reduced when performing beamformed transmission of at least part of the CRS such that the reference signal received power as measured by the UE is on the same level regardless of beamformed transmission of CRS or non-beamformed transmission of CRS.

11. The method of claim 10, wherein the selected subset includes reference symbols within the available frequency spectrum of the CRS except for a number of Physical Resource Blocks, PRBs, located in the middle of the frequency spectrum.

12. The method of claim 11, wherein the PRBs located in the middle of the frequency spectrum are associated with non-beamforming CRS transmissions.

13. A network device configured to manage transmission of a Cell-specific Reference Signal, CRS, comprising a plurality of reference symbols in a wireless communication system operating at least one cell or sector, the network device comprising a memory comprising executable instructions that when executed by a processor of the network device causes the network device to operate to:
identify a user equipment, UE, for which a beamformed transmission of data is scheduled during a transmission time interval,
select a subset of the plurality of reference symbols of the CRS of the least one cell or sector for beamforming, and
control transmission of the subset of the plurality of reference symbols of the CRS to enable beamforming for targeting the identified UE,
wherein the selected subset includes reference symbols within the available frequency spectrum of the CRS except for a number of Physical Resource Blocks, PRBs, located in the middle of the frequency spectrum.

14. The network device of claim 13, wherein the PRBs located in the middle of the frequency spectrum are associated with non-beamforming CRS transmissions.

15. A computer program product comprised on a non-transitory computer readable medium, the computer program product comprising instructions, which when executed by at least one processor, cause the at least one processor to operate to:
identify a User Equipment, UE, for which a beamformed transmission of data is scheduled during a transmission time interval,
select a subset of the plurality of reference symbols of the CRS of the least one cell or sector for beamforming, and
control transmission of the subset of the plurality of reference symbols of the CRS to enable beamforming for targeting the identified UE,
wherein the selected subset includes reference symbols within the available frequency spectrum of the CRS except for a number of Physical Resource Blocks, PRBs, located in the middle of the frequency spectrum.

16. The computer program product of claim 15, wherein the PRBs located in the middle of the frequency spectrum are associated with non-beamforming CRS transmissions.

* * * * *